April 15, 1969      H. L. WALDRON      3,438,659
DOWEL TYPE FASTENER WITH SHEAR COLLAR
Filed May 15, 1967      Sheet 1 of 2
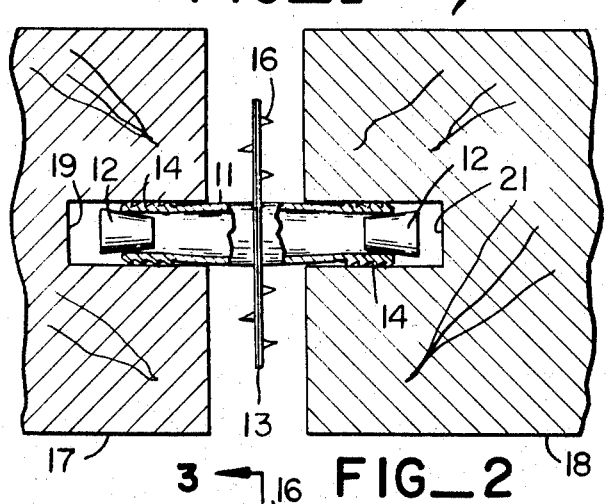
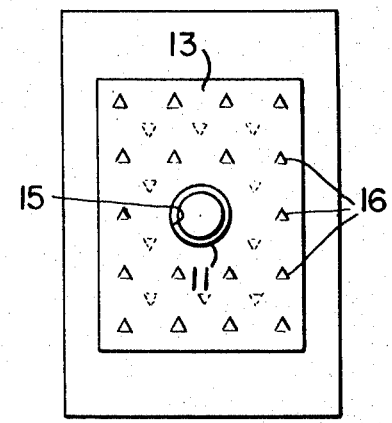
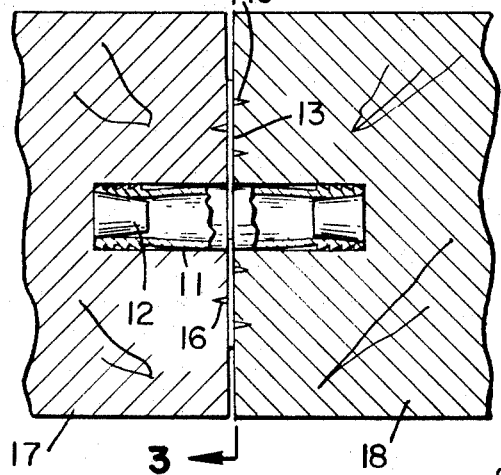
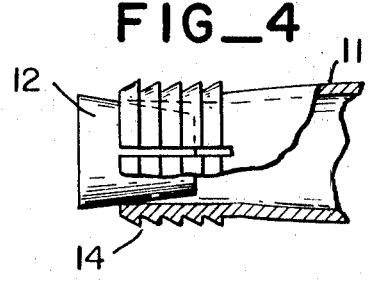
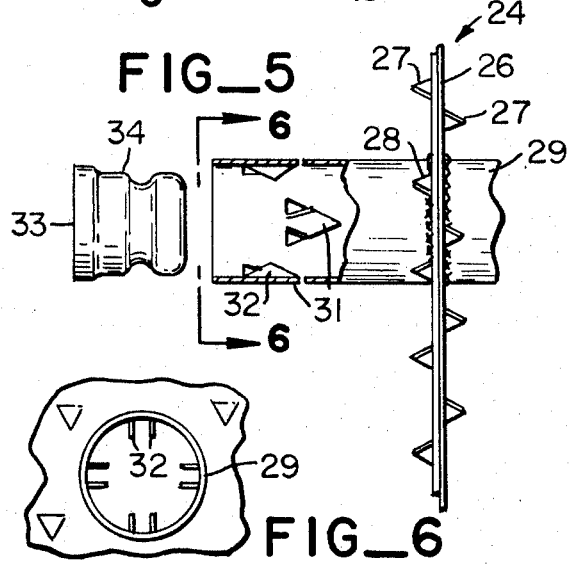
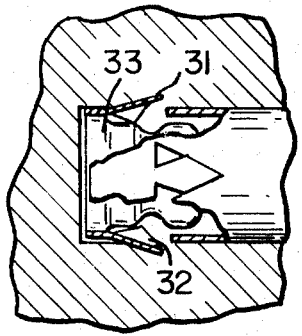
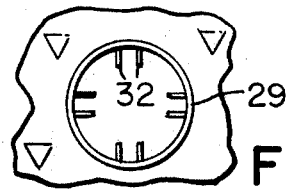
INVENTOR.
HOWARD LAWRENCE WALDRON
ATTORNEYS

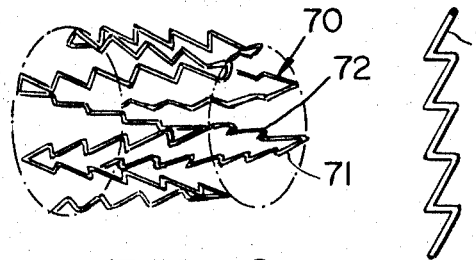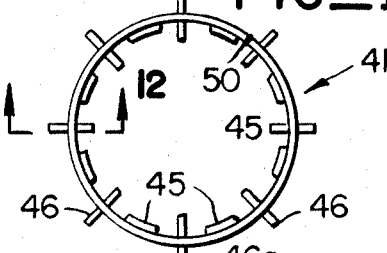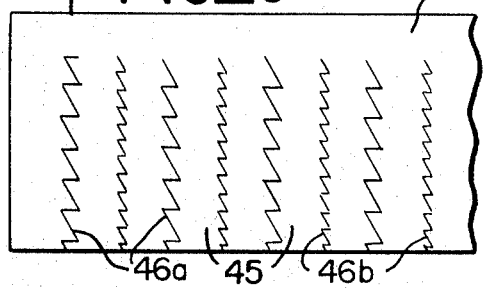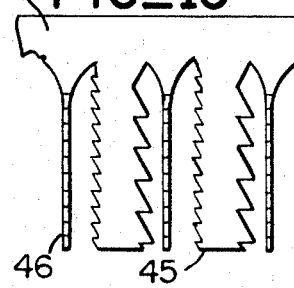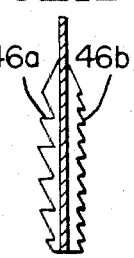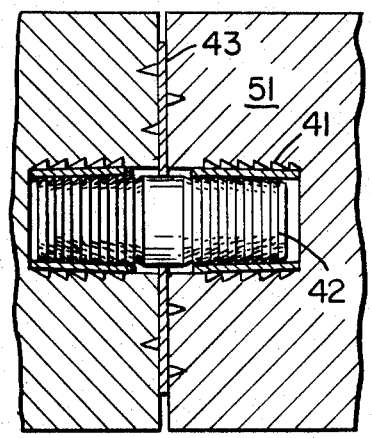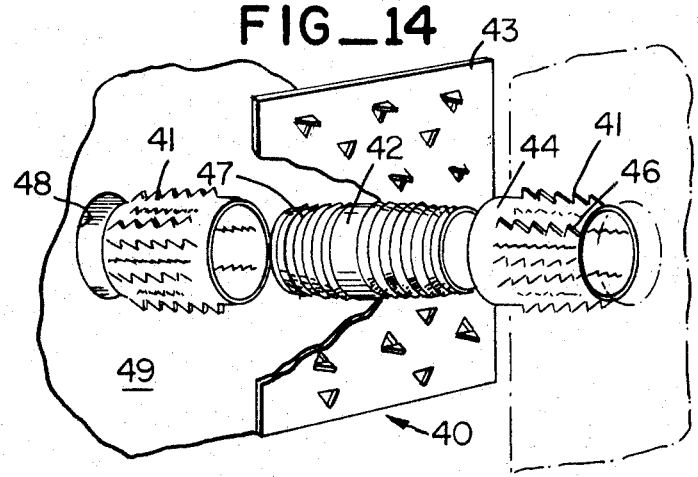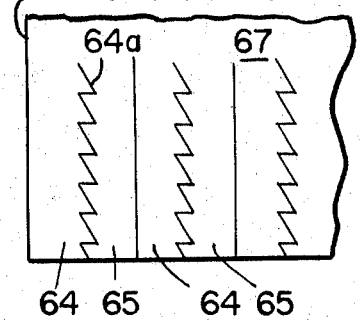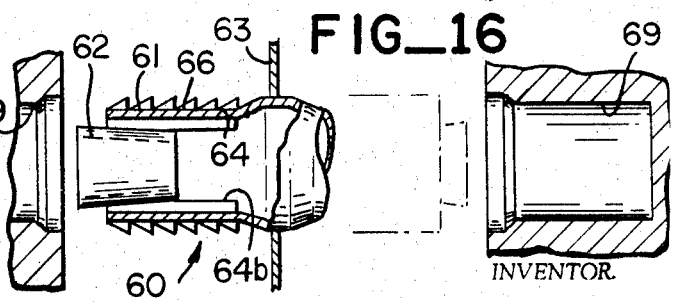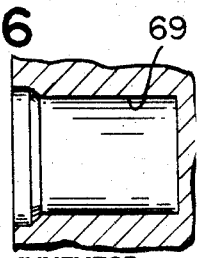

United States Patent Office 3,438,659
Patented Apr. 15, 1969

3,438,659
DOWEL TYPE FASTENER WITH SHEAR COLLAR
Howard Lawrence Waldron, 2510 Wexford Ave.,
South San Francisco, Calif. 94080
Filed May 15, 1967, Ser. No. 638,406
Int. Cl. F16b 7/00, 5/00, 9/00, 13/00
U.S. Cl. 287—20.92                                 8 Claims

ABSTRACT OF THE DISCLOSURE

A dowel type fastener supplying three zones of fixity to a butt joint is disclosed. A first zone of fixity is furnished by a shear collar secured to a tubular element extending into each joint member, the collar having projections in penetrating engagement with the co-facing surfaces of the joint members. Two other zones of fixity are supplied on each end on the tubular member by teeth gripping the sidewalls of the joint hole. One embodiment includes a tubular sleeve provided with a telescopic insert at each end to urge teeth into engagement with the sidewalls. Another embodiment includes a pair of tubular sleeves and an elongate insert having indentations to interlock with internal teeth on the sleeves while the external teeth of the sleeve engage the sidewalls of the joint hole.

---

This invention relates to a fastening device for securing materials together in an abutting relationship to form a permanent joint.

Background of the invention and objects

The prior art discloses doweled or pinned fastened joints which in the main have been successful for securing two or more joint members together. Furthermore, the prior art such as the U.S. patent to Evans No. 1,060,-453, granted April 29, 1913, discloses a dowel equipped at its ends with expansion means to obtain a secure hold on the joint members at points remote from the interface of the joint. A related concept in expansion dowels is shown in the U.S. patent to Foster No. 1,555,242, granted Sept. 29, 1925. However, the dowel joints in the prior art were vulnerable to loosening by reason of twisting or slippage along the interface between the two work pieces or joint members, the interface having only a modest shear resistance. The prior art also taught in a dowel joint construction the concept of applying glue at the interface of the two joined bodies. The shear strength and torsional resistance of the glue in these cases provides a serious limitation to the strength of the joint. In the case of a glued dowel joint, once slippage occurred at the joint interface, the joint was more vulnerable to torsion and bending forces. Moreover, glued dowel joints are best adapted to shop assembly as contrasted with shop preparation and field assembly. Certain of the prior art devices had serious limitations when specifications demanded that a relatively hard and relatively soft material such as wood and stone be joined by means of a pin or dowel connection.

A general object of this invention is to provide an improved mechanical fastening device which affords three zones of fixity in the joint, two of the zones being displaced from the interface.

Another object of the invention is to provide a mechanical fastening device for a butt joint which is concealed from view in the assembly of the joint and which affords a substantially permanent connection.

Yet another object is to provide a mechanical fastening device which facilitates joining together of dissimilar materials and which is adapted for shop preparation and field assembly.

Further objects of the invention pertain to the particular arrangement of the fastening device whereby the above outlined and additional operating features are attained.

The invention, both as to its production and method of use together with further objects, is to be understood by reference to the following specification taken in association with the accompanying drawings.

Summary of the invention

This invention in a fastening device affords a butt joint with three zones of fixity and comprises a tubular sleeve member provided with tooth-like outer projections caused to be embedded in the side walls of each joint hole by an internally received insert member. This affords fixity to the joint by utilizing the attachment strength between the sleeve and the inner surface of the large cylindrical joint hole. A plate member having a surface for gripping engagement with the confronting faces of the joint members is disposed around the joint hole to maintain fixity between the joint members at the joint interface. The fastener and resulting joint are well adapted for shop preparation by mass production methods and the invention is useful for joining together materials of different hardness and strength.

Brief description of the drawings

FIGURE 1 is a sectional view showing two pieces of material to be joined by a fastening device incorporating the invention;

FIGURE 2 is a view similar to FIGURE 1 but with materials shown in the connected condition;

FIGURE 3 is a sectional view taken along the line 3—3 of FIGURE 2;

FIGURE 4 is an enlarged detailed view of one end of the fastening device;

FIGURE 5 is an elevational view, partly broken away, of another embodiment of the invention;

FIGURE 6 is a view taken along the lines 6—6 of FIGURE 5;

FIGURE 7 is a sectional view showing the device of FIGURES 5 and 6 embedded in the material to be fastened;

FIGURES 8 and 8a are perspective and sectional views, respectively, of another preferred embodiment of a sleeve element;

FIGURES 9 through 12 are views showing the steps in the fabrication of a sleeve element of yet another embodiment of the invention;

FIGURE 13 is a view like FIGURE 2 but showing the embodiment of the invention including the sleeve elements of FIGURES 9 through 12;

FIGURE 14 is an exploded perspective view of the embodiment shown in FIGURE 13;

FIG. 15 is a developed view of the material used to form the sleeve of still another preferred embodiment of the invention; and FIGURE 16 is an elevational view, partially in section, showing the embodiment concerning FIGURE 15.

Description of the preferred embodiments

Referring first to FIGURES 1 through 4, the fastening device 10 in accordance with this embodiment of the invention includes a tubular, cylindrical sleeve or ferrule 11, an insert or tapered plug 12 telescopically arranged in each end of the sleeve 11, and a flat shear plate or collar 13 mounted about the mid-point of the sleeve 11.

The sleeve or ferrule 11 is generally tapered from a maximum diameter at its center to a minimum at its ends and is there provided with a plurality of gripping elements such as the teeth 14. The inserts 12 are at the outset loosely mounted at each end of the sleeve 11 as shown in FIGURES 1 and 4. The insert 12 is adapted, when forced inwardly of the sleeve 11, to urge the teeth 14 outwardly.

The shear collar 13 is provided with pointed tooth-like elements 16 on each side thereof extending generally perpendicular to the plane of the plate. It is also feasible to provide the flat plate or shear collar 13 with other varieties of rough textured surfaces to perform the functions explained below.

The fastening device 10 is especially useful to form a permanent butt joint between two members such as the members 17 and 18 which may be wood members. In butt joint construction it is conventional to form the confronting faces of the joint planar.

In the present embodiment of the invention each member 17 and 18 is provided with a hole 19 and 21 respectively of pre-determined depth and diameter. The diameter of the holes 19 and 21 is large as compared to prior art fasteners and is selected to be a diameter slightly greater than the maximum outside diameter as measured over the non-extended gripping means or teeth 14 at the ends of the ferrule or sleeve 11. The combined depth of the two holes 19, 21 is selected to be a dimension slightly greater than the length of the ferrule 11. Also, it is to be appreciated that the medial portion of the ferrule or sleeve is slightly larger in diameter than the end portions thereof and the medial diameter is only slightly less than the maximum diameter of the holes.

When the holes 19, 21 have been prepared, such as by drilling, one end of the ferrule or sleeve 11 with an insert 12 disposed therein is placed in each hole with the shear collar or plate 13 aligned in substantial registry with both of the members to be abutted 17, 18 as shown in FIGURE 3. The members 17, 18 are then driven together to a position as shown in FIGURE 2 whereby the inserts 12 cause the teeth 14 to move outwardly to embed themselves in the sidewalls of the holes 19, 21 in a zone at a point remote from the interface between the two joint members. The teeth 14 on each end of the ferrule or sleeve 11 dig into the sides of the joint holes to provide two of the zones of fixity in the joint thus formed. The projections 16 on the shear collar 13 pierce the confronting faces of the members 17, 18 in the area surrounding the holes 19, 21. The central opening 15 in the collar 13 is sized to snugly engage the medial portion of the ferrule or sleeve 11 in substantially a press fit. Thus arranged and cooperating, the shear collar 13 provides a third zone of fixity in the joint. The penetration of the teeth 16 into the confronting joint faces while the plate 13 is snugly fitted about the sleeve or ferrule 11 provides a high measure of shear resistance as well as torsional resistance in the joint formed with the fastening device 10. This joint also has a high bending resistance in that it is quite difficult to disengage the internal teeth 14 from the sidewalls of the holes and therefore the two joint members 17, 18 are maintained snugly together with their confronting portions abutting the plate 13 to form a beam. Thus, if the three zones of fixity are maintained at the two ends of the ferrule, and at the collar near its center, the joint can fail in bending only if the material of one of the joint members at the interface of the two joint members is compressed.

Referring to FIGURES 5 through 7 another embodiment 24 of the invention is shown wherein the shear collar 26 is formed from two sheets of metal material each having teeth 27 extending from the general plane thereof. A circular portion 28 is provided in the central part of the collar 24 to securely engage a medial expanse of a tubular sleeve 29 in a snug manner. The sleeve or ferrule 29 is formed from sheet metal in a manner to provide the ends thereof each with a row of teeth 31 which project towards the center of the ferrule and which project away from its ends. Laterally spaced on each tooth 31 is a pair of depending flanges 32 which extend generally radially inwardly of the sleeve or ferrule 29, as clearly shown in FIGURE 6. It is to be understood that the teeth 31 and flanges 32 are punched from sheet material in the flat and thereafter the material is formed into a tube or cylinder and then joined together such as by spot welding or other means well known in the art of sheet metal forming.

An insert or expansion member 33 for the fastening device 24 is adapted to cooperate with the flanges 32 and to the end is provided with cam surfaces 34 which engage the flanges 33 and urge them outwardly during the assembly of the joint so that the teeth 31 engage and penetrate the sidewalls of the hole to resist withdrawal of the ferrule or sleeve 29.

Another preferred embodiment of the invention is shown in FIGURES 9 through 14. There a fastening device 40 includes two tubular cylindrical sleeves 41, an elongate insert 42 received telescopically within each of the sleeves 40, and a flat shear plate or collar 43, which is mounted upon the medial section of the insert 42.

Each of the two sleeves 41 comprises a circular band or margin 44 having extending axially therefrom a plurality of circumferentially spaced apart flange members 46. Each flange is formed integrally with the band 44 but is unconnected and free at its opposite end. In cross section as shown in FIGURE 11, the flange 46 extends generally radially of the sleeve and its outer edge 46a is serrated in a tooth-like pattern, the rake of the teeth being in a direction to resist withdrawal of the sleeve 41 from a hole in a joint member, as shown in FIGURE 12. The inner edge 46b of each flange 46 is also serrated but in a direction opposite to that of the outer edge, the serrations of the inner edge being for the purpose of resisting withdrawal of the insert member 42 from the sleeve 41. A skirt element 45 extends from the band 44 and is arranged intermediate to each pair of flanges 46. The steps in forming the sleeves 41 will be described below.

The insert member 42 may be a hollow, cylindrical tubular member as well as solid. The insert member may be tapered as shown from a maximum diameter at its center to a minimum at its ends. It may also be of uniform diameter. The insert is provided with longitudinally spaced circumferential protuberances or threads 47 adjacent to each end thereof to cooperate with the serrations or teeth along the inner edge 46b of the flanges 46. The protuberances or threads 47 may be formed by rolling or turning in an automatic screw machine, or the protuberances may be formed as flaps punched outward from a hollow cylindrical insert (not shown). At the end portions the outside diameter of the insert 42 is selected in relation to the sleeve 41. The insert will engage and interlock with the teeth on edge 46b and urge the teeth on edge 46a into the sidewalls of the joint hole 48.

The shear plate or collar 43 may be constructed similarly to the collar 13 described above or may be simply a rough textured surface much like that of coarse sand paper or the like. The function of the plate 43 is to engage against the confronting surfaces of butt joint and thereby to resist sliding movement of the joint members while the collar firmly engages about the mid-portion of the insert 42.

The fastening device 40 is especially useful to form a permanent butt joint between two members such as the joint members 49, 51, one of which may be of a material different from the other. In that situation the holes 48 in the material are sized, and the sleeve member 41 and the outer teeth are especially designed to cooperate with each of the two materials. After the holes 48 in the joint members have been bored, a sleeve 41 is loosely placed therein. The shear collar 43 is mounted upon the insert 42 and the insert is telescoped into each of the sleeves 41. Thereafter the joint members are forced together, the insert member urging the outer serrations of the sleeves into the side walls of the hole 48 while the tooth elements on the shear plate 43 penetrate the confronting faces of the joint members 48, 51.

The sleeve members 41 may be formed from a blank sheet of metal 52 which may be perforated, sheared or pierced in a manner well known in the metal working art as shown in FIGURE 9 to leave at the top marginal portion the band element 44 and to form the serrated edges of the flanges 46. It will be noted that the flange members 46 at one end are integral with the band 44 but free at the opposite end. A subsequent manufacturing step is to rotate or twist the flanges 46 out of the plane of the blank 52 and of the skirts 45 to approximately a perpendicular attitude as shown in FIGURE 10. The thus formed material may be cut to the desired length and rolled into circular form and the abutting edges thereafter spot welded as at 50 in FIGURE 11 or otherwise suitably joined. It will be recognized that by selecting the length of the blank 52 the sleeve 41 may be made of any desired diameter.

Another form of tubular sleeve 70 is adapted to cooperate with an insert constructed generally in the form of the insert member 42 as shown in FIGS. 8 and 8a. The sleeve 70 is constructed of wire and is configurated with points to resemble a king's crown. More specifically, the sleeve 70 is cylindrical in outline with a continuous wire member 71 zigzagging in both the axially and transverse directions. The sleeve 70 is formed by first working the wire 71 into a flat pattern of connected chevrons. Then, the flat or planar configuration is rolled or pressed transversely to form a tooth-like or zigzag construction as shown in FIGURE 8a. A length of the thus formed wire is then rolled into a cylindrical shape and its ends are joined by welding as at 72 to form a continuous element. Thus the sleeve 70 is provided with teeth on the outer and inner periphery. The sleeve 70 is used in much the same manner as the sleeve 41 previously described and is used to best advantage in relatively soft, easily crushed materials.

Yet another preferred embodiment of the invention 60 is shown in FIGURES 15 and 16 and includes the sleeve member 61, two inserts 62, and a shear collar 63.

The sleeve 61 of the fastening device 60 is an elongated tubular element, tapered toward its ends, and may be formed of sheet material and provided at its ends with flanges 64 formed with serrations or teeth 64a somewhat in the manner of the flanges 46 of the fastener 40. However, in the case of the flanges 64 the inner edges 64b thereof are left plain, the flanges 64 extending axially from a medial band portions 67. Intermediate each pair of flanges 64 is a skirt element 65 which extends from the medial band portion 67.

The insert member 62 is frusto-conically shaped and is sized to engage the inner edges 64b of the flanges 64 so as to urge the same into engagement with the side walls of a hole 69 in a joint member. The insert 62 may be formed from sheet materials or may be solid.

The shear plate or collar 63 may be rough textured in the form of sandpaper or may be equipped with protrusions such as those described above.

While there has been described what is at present considered to be the preferred embodiments of the invention, it will be understood that various modifications may be made therein.

I claim:

1. A fastening device insertable into a cylindrical hole of predetermined diameter for forming a butt joint between two pieces of material, comprising: cylindrically tubular sleeve means of a diameter slightly smaller than the hole for insertion therein, outwardly extending gripping teeth on said sleeve means serving to engage the side walls of the hole in the assembled condition of the joint, insert means extending telescopically into said sleeve means and having means thereon serving to urge and maintain said teeth in engagement with the side walls of the hole, and a flat, planar shear collar having teeth extending from the plane thereof generally axially of said cylindrical sleeve means in both directions and serving to penetrate the interface of the butt joint in the area surrounding the hole in the assembled condition of the joint.

2. A fastening device as defined in claim 1 wherein said shear collar is arranged about said tubular sleeve means, said insert means including an expansion member received in each end of said sleeve means.

3. A fastening device as defined in claim 1 wherein said shear collar is arranged about said insert means, said tubular sleeve means including a member disposed over each end of said insert means.

4. A fastening device as defined in claim 1 wherein said gripping teeth on said sleeve means include flanges extending generally radially inwardly of said tubular sleeve means and wherein said insert means includes cam surfaces serving to cooperate with said flanges forcing said teeth outward of said sleeve means.

5. A fastening device insertable into a cylindrical hole of predetermined diameter for forming a butt joint between two pieces of material comprising: a pair of tubular sleeves of a diameter slightly smaler than the hole for insertion therein, a plurality of rows of outwardly extending teeth arranged on each sleeve serving to resistingly engage the sidewalls of the hole, a plurality of rows of inwardly projecting teeth arranged on each sleeve, an elongate insert member receivable into each sleeve and having a surface configurated to resistingly engage the inwardly projecting teeth on said sleeve and of a diameter in relation to said sleeve to urge said outwardly directed teeth into penetrating engagement with the sidewalls of the hole, and a shear collar on said insert member, rough textured surfaces on said shear collar for engagement with the confronting surfaces of the two pieces of material about the hole and serving to provide fixity at the interface of the butt joint.

6. A fastening device as defined in claim 5 wherein said tubular sleeves each include a circular band, a plurality of flanges extending axially from said band and each projecting generally radially of said band, the inner and outer edges of each flange being provided with serrations, the rake of said serrations being directed oppositely on said outer and inner edges of said flange.

7. A fastening device as defined in claim 5 wherein such sleeves are of wire material formed into chevrons connected together and arranged in a circle, in the radial direction the wire being formed in a zigzag pattern presenting the outer teeth to the sidewalls of the hole and the inner teeth to the insert member.

8. A structural joint having three zones of fixity comprising: cylindrical tubular sleeve means, first and second members to be joined, each of said members having a hole therein for receiving said tubular sleeve means, the holes in said members being of a diameter slightly greater than the maximum diameter of said tubular sleeve means, outwardly expandable gripping teeth on said sleeve means serving to engage the sidewalls of said hole in the assembled condition of the joint, insert means extending telescopically into said sleeve means and having means thereon serving to urge and maintain said teeth in engagement with the sidewalls of each hole therewith to form first and second zones of fixity, and a flat planar shear collar having rough textured surfaces extending generally axially of said cylindrical sleeve for engagement with the confronting surfaces of the two pieces of material about the holes and serving to provide with such confronting surfaces a third zone of fixity at the interface of the joint.

References Cited

UNITED STATES PATENTS

| | | |
|---|---|---|
| 637,141 | 11/1899 | Mark. |
| 1,051,427 | 1/1913 | McCluskey. |
| 1,114,971 | 10/1914 | Diefendorf ____ 85—85 |
| 1,150,358 | 8/1915 | Gilmer ____ 85—84 |
| 1,429,200 | 9/1922 | Fotacos. |
| 1,723,306 | 8/1929 | Sipe. |
| 2,236,926 | 4/1941 | Surface ____ 85—84 |
| 2,277,956 | 3/1942 | Coffman. |

FOREIGN PATENTS

| | | |
|---|---|---|
| 915,419 | 6/1946 | France. |
| 66,271 | 5/1956 | France. |
| 886,997 | 1/1962 | Great Britain. |
| 350,463 | 7/1937 | Italy. |
| 233,812 | 8/1944 | Switzerland. |

MARION PARSONS, Jr., *Primary Examiner.*

U.S. Cl. X.R.

85—84, 67; 287—127